United States Patent [19]
Dieringer

[11] Patent Number: 6,161,903
[45] Date of Patent: Dec. 19, 2000

[54] BRAKE-PRESSURE-TRANSMITTER ARRANGEMENT FOR A HYDRAULIC MOTOR-VEHICLE BRAKE SYSTEM, AND BRAKE SYSTEM EQUIPPED THEREWITH

[75] Inventor: Werner Dieringer, Vallendar, Germany

[73] Assignee: Lucas Industries public limited company, United Kingdom

[21] Appl. No.: 09/419,397

[22] Filed: Oct. 15, 1999

Related U.S. Application Data

[63] Continuation-in-part of application No. PCT/EP98/02326, Apr. 20, 1998.

[30]     Foreign Application Priority Data

Apr. 18, 1997 [DE] Germany .......................... 197 16 404

[51] Int. Cl.⁷ .................................................. B60T 13/13
[52] U.S. Cl. .......................... 303/114.1; 188/358; 60/566
[58] Field of Search .................................... 303/10, 114.1; 188/358, 359, 360; 60/545, 547.1, 565, 566; 91/47

[56]              References Cited

U.S. PATENT DOCUMENTS

| 4,395,072 | 7/1983 | Belart ................................... 303/114.1 |
| 4,878,715 | 11/1989 | Toda ........................................ 303/110 |
| 4,950,028 | 8/1990 | Harrison . |
| 5,567,021 | 10/1996 | Gaillard ................................. 303/358 |
| 5,727,852 | 3/1998 | Pueschel et al. ...................... 303/113.4 |

FOREIGN PATENT DOCUMENTS

| 0317182 | 5/1989 | European Pat. Off. . |
| 0436926 | 7/1991 | European Pat. Off. . |
| 0485367 A2 | 5/1992 | European Pat. Off. . |
| 2845794 C2 | 4/1979 | Germany . |
| 3209337 A1 | 9/1983 | Germany . |
| 3426612 A1 | 1/1986 | Germany . |
| 3831426 C2 | 4/1989 | Germany . |
| 3903532 A1 | 8/1989 | Germany . |
| 4203488 A1 | 8/1993 | Germany . |
| 4439904 A1 | 5/1996 | Germany . |
| 4443869 A1 | 6/1996 | Germany . |
| 19501760 A1 | 7/1996 | Germany . |

*Primary Examiner*—Christopher P. Schwartz
*Attorney, Agent, or Firm*—MacMillan, Sobanski & Todd, LLC

[57]              ABSTRACT

A brake-pressure-transmitter arrangement (1) for a hydraulic motor-vehicle brake system, after an actuating force (F) has been introduced via an input member (brake pedal 2), by reduction in the volume of a hydraulic chamber (4) to be filled with brake fluid, provides a brake pressure at the output of the hydraulic chamber (4) for at least one wheel brake (3). In addition to the hydraulic chamber (4), there is a hydraulic chamber (6) for brake fluid, and the volume of this hydraulic chamber (6) is likewise reduced after introduction of the actuating force (F). To amplify the brake force, an output of this additional hydraulic chamber (6) is in fluid connection with the input side (10e) of a booster pump (10), which delivers brake fluid in the direction from the additional hydraulic chamber (6) to the at least one wheel brake (3). The output side (10a) of the booster pump (10) is in fluid connection with the output of the hydraulic chamber (4), so that an increased brake pressure is provided for the at least one wheel brake (3).

27 Claims, 7 Drawing Sheets

BRAKE-PRESSURE-TRANSMITTER ARRANGEMENT FOR A HYDRAULIC MOTOR-VEHICLE BRAKE SYSTEM, AND BRAKE SYSTEM EQUIPPED THEREWITH

CROSS REFERENCE TO RELATED APPLICATIONS

This application is a continuation of International application PCT/EP98/02326 filed Apr. 20, 1998, which claims priority to German Patent Application No. 19716404.8 filed Apr. 18, 1997.

BACKGROUND OF THE INVENTION

The invention relates to a brake-pressure-transmitter (master cylinder) arrangement for a hydraulic motor-vehicle brake system according to the preamble of Patent claim 1 and to a brake system equipped therewith.

It is generally known that, in hydraulic brake systems for motor vehicles, the brake-pressure-transmitter arrangement comprises a so-called master cylinder in order to produce a brake pressure for the wheel brake, this brake pressure being proportional to the actuating force introduced via the input member—normally a brake pedal. Furthermore, it is generally known to also equip the brake-pressure-transmitter arrangement with a brake booster, which provides an auxiliary force in order to amplify the actuating force introduced via the brake pedal. Suitable brake boosters are both pneumatic boosters, which work according to the vacuum principle, and hydraulic boosters, which work with a hydraulic pump.

DE 28 45 794 C2, for example, discloses such a pneumatic brake booster, whereas DE 44 43 869 A1, for example, discloses a hydraulic brake booster. Both the pneumatic and the hydraulic brake boosters have a movable wall, which divides an inner housing space into two chambers and transmits a force via an output member to the master cylinder when the chambers are subjected to a pressure difference as a function of a force effective at the input member. In the non-actuated state the chambers are pressure-balanced, so that the movable wall transmits no force to the output member. In the pneumatic booster, the pressure difference is produced by a vacuum being produced in one chamber by means of a vacuum source, whereas atmospheric pressure is applied to the other chamber. In contrast, the pressure difference in the hydraulic booster is produced by means of a hydraulic pump, the suction side-of which is connected to one chamber and the pressure side of which is connected to the other chamber, so that the hydraulic pump delivers in the direction from one chamber to the other chamber in order to obtain brake-force amplification.

Nonetheless, such a hydraulic brake system is worth improving, since the use of a generally known brake booster requires a relatively large installation space in the motor vehicle.

Furthermore, when a pneumatic brake booster is used, a vacuum source must be provided in the motor vehicle. Although the vacuum produced in the intake duct may be utilized in principle in a vehicle equipped with a spark-ignition engine, however, pronounced fluctuations of the vacuum produced in this way may adversely affect the performance of the brake system, in particular with regard to the constantly increasing performance requirements, so that outlay and costs for the provision of an independent vacuum source are inevitable.

A disadvantage with the use of a known hydraulic booster may be that additional valve arrangements, electromagnetically actuated as a rule, are necessary in order to ensure a pressure compensation for all chambers and working spaces, including those of the wheel brakes, when the brake-pressure-transmitter arrangement is not actuated. This also results in outlay and costs.

SUMMARY OF THE INVENTION

The object of the invention is to provide an improved hydraulic brake system which is more compact and can be produced at a lower cost and can also be actuated in a comfortable manner.

This object is achieved according to the invention with a brake-pressure-transmitter arrangement which has the features specified in Patent claim 1.

According to the invention, when the brake-pressure-transmitter arrangement is actuated, the brake-fluid quantity which occurs at the input side of the booster pump on account of the reduction in the volume of the additional hydraulic chamber is additionally fed by means of the booster pump to the brake-fluid quantity occurring in the wheel brake on account of the reduction in the volume of the hydraulic chamber. This brake-fluid quantity additionally delivered into the wheel brake by means of the booster pump causes a higher brake pressure in the wheel brake or the hydraulic chamber, respectively, than the brake pressure originally produced in the hydraulic chamber. Thus an amplification of the actuating force introduced via the input member can be achieved in an especially advantageous manner, in which case the disadvantages described above when using a generally known brake booster are avoided.

To supply the hydraulic brake system with brake fluid, provision is made for the hydraulic chamber and/or the additional hydraulic chamber to be connected to a reservoir for brake fluid when the brake-pressure-transmitter arrangement is not actuated.

Furthermore, in order to produce a brake pressure, provision is made for the hydraulic chamber and the additional hydraulic chamber not to be connected to the reservoir for brake fluid when the brake-pressure-transmitter arrangment is actuated.

So that only the hydraulic chamber or the additional hydraulic chamber needs to have a connection to the reservoir for brake fluid, the hydraulic chamber may be connected to the additional hydraulic chamber when the brake-pressure-transmitter arrangement is not actuated.

When the brake-pressure-transmitter arrangement is actuated, the hydraulic chamber is not connected to the additional hydraulic chamber, as a result of which recirculation of brake fluid between the hydraulic chamber and the additional hydraulic chamber is not possible, so that a brake pressure for the wheel brake can be produced without hindrance.

In order to achieve an amplification of the actuating force, introduced via the brake pedal, in the order of magnitude of generally known brake boosters, the brake-pressure-transmitter arrangement is dimensioned in such a way that, when the brake-pressure-transmitter arrangement is actuated, the volume of the hydraulic chamber is reduced by a smaller percentage than the volume of the additional hydraulic chamber.

In this case, there is a constant connection between the additional hydraulic chamber and the booster pump.

For reasons of saving drive energy, it is better if the booster pump is actuated only when the brake pedal is actuated.

In an advantageous manner, the control behaviour of the hydraulic brake system with regard to pedal comfort and metering capacity is improved in that the delivery rate of the booster pump can be set as a function of a variable related to the actuation of the brake pedal.

It is especially advantageous, in order to achieve a virtually ideal control behaviour for the hydraulic brake system, if the delivery rate of the booster pump can be set as a function of the change in the volume of the additional hydraulic chamber.

The booster pump preferably does not permit flow in the direction from the wheel brake to the additional hydraulic chamber. As a result, a brake pressure in the wheel brake can be kept temporarily constant when the brake-pressure-transmitter arrangement is actuated and the booster pump is not actuated.

Furthermore, a valve arrangement may be arranged parallel to the booster pump, wherein in a first position of the valve arrangement, there is a direct connection between the additional hydraulic chamber and the wheel brake and, in a second position of the valve arrangement, there is a connection between the additional hydraulic chamber and the wheel brake via the booster pump only.

The valve arrangement being preferably designed in such a way that the valve arrangment assumes the first position as a basic position in a spring-actuated manner and assumes the second position as an actuating position as a function of a pressure produced in the additional hydraulic chamber.

As an alternative, provision may be made for the delivery direction of the booster pump to be reversible, so that the booster pump can also deliver in the direction from the wheel brake to the additional hydraulic chamber. As a result, the valve arrangement arranged parallel to the booster pump may be dispensed with.

A decisive contribution is made to the saving of components and thus costs if an anti-lock control device is arranged between the brake-pressure-transmitter arrangement and the wheel brake, the booster pump being an integral part of the anti-lock control device. In this case, it is also of advantage with regard to saving installation space that the brake-pressure-transmitter arrangement and the anti-lock control device can be integrated to form a compact construction unit.

In order to produce an admission pressure at the input side of the booster pump when the brake pedal is actuated, a non-return valve is arranged between the accumulator of the anti-lock control device and the input side of the booster pump, the non-return valve permitting a flow connection in the direction from the accumulator to the input side of the booster pump only.

In this case, a restrictor may be arranged parallel to the non-return valve in order to adapt the pedal feel.

So that traction control may also be carried out with the hydraulic brake system, a changeover valve is arranged between the brake-pressure-transmitter arrangement and the anti-lock control device or the wheel brake, respectively, in order to provide or interrupt a connection between the brake-pressure-transmitter arrangement and the anti-lock control device or the wheel brake, respectively.

To avoid damage to the hydraulic brake system or its components, a pressure relief valve may at the same time be arranged parallel to the changeover valve.

In order to achieve the rapid pressure rise required for precharging the booster pump during vehicle dynamics control, a precharging unit, which can be actuated by means of an electronically controllable actuator, is arranged between the reservoir and the additional hydraulic chamber.

If the hydraulic brake system is also to be capable of carrying out emergency or directional braking, an electronically controllable brake booster may be provided in order to actuate the brake-pressure-transmitter arrangement instead of or in addition to an actuation via the brake pedal.

Since the statutory regulations require a dual split brake-circuit system, the hydraulic brake system has a first and a second brake circuit, wherein one brake-pressure-transmitter arrangement is arranged for each of the first and second brake circuits.

The brake-pressure-transmitter arrangements provided for each of the first and second brake circuits are preferably arranged parallel to one another and can be actuated synchronously via the brake pedal.

In order to prevent transverse forces from being transmitted to the brake-pressure-transmitter arrangements when the brake pedal is actuated, the brake pedal is coupled to a guide element, which is axially displaceable parallel to the brake-pressure-transmitter arrangements provided for each of the first and second brake circuits.

In order to introduce equal force proportions into the brake-pressure-transmitter arrangements, arranged parallel to one another, when the brake pedal is actuated, the actuating force introduced via the brake pedal is introduced via a balance-beam arrangement into the brake-pressure-transmitter arrangements provided for each of the first and second brake circuits.

DETAILED DESCRIPTION OF THE PREFERRED EMBODIMENT

Figure 1:
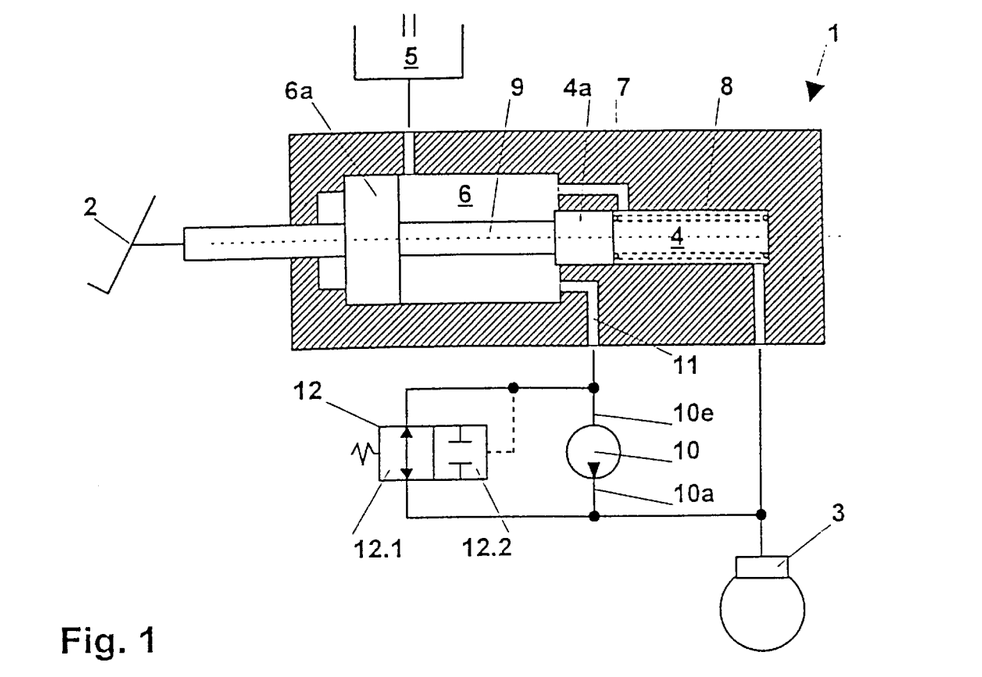
FIG. 1 shows a hydraulic brake system in a non-actuated state.

The hydraulic brake system shown schematically in FIG. 1 has a brake-pressure-transmitter arrangement 1, which can be actuated via a brake pedal 2 in order to produce a brake pressure for a wheel brake 3. The brake pressure is produced in a hydraulic chamber 4, to which the wheel brake 3 is connected.

A reservoir 5 is provided for the brake-fluid supply. The reservoir 5 is connected to an additional hydraulic chamber 6, which is connected to the hydraulic chamber 4 via a passage 7. Instead, however, the reservoir 5 may also be connected to the hydraulic chamber 4, or the additional hydraulic chamber 6 and the hydraulic chamber 4 may be connected to the reservoir 5, so that the passage 7 connecting the chambers 6, 4 may be omitted.

To produce the brake pressure, the hydraulic chamber 4 is defined on one side by an axially displaceable piston 4a. The displacement of the piston 4a is effected when the brake-pressure-transmitter arrangement 1 is actuated by introduction of an actuating force F via the brake pedal 2. A spring arrangement 8 counteracts the displacement of the piston 4a when the brake pedal 2 is actuated and causes the brake-pressure-transmitter arrangement 1, in the non-actuated state, to assume the basic position shown in FIG. 1. In this basic position, the piston 4a assumes a position in which the passage 7 providing the connection to the additional hydraulic chamber 6 is open, so that the hydraulic chamber 4 is connected to the reservoir 5.

Figure 2:
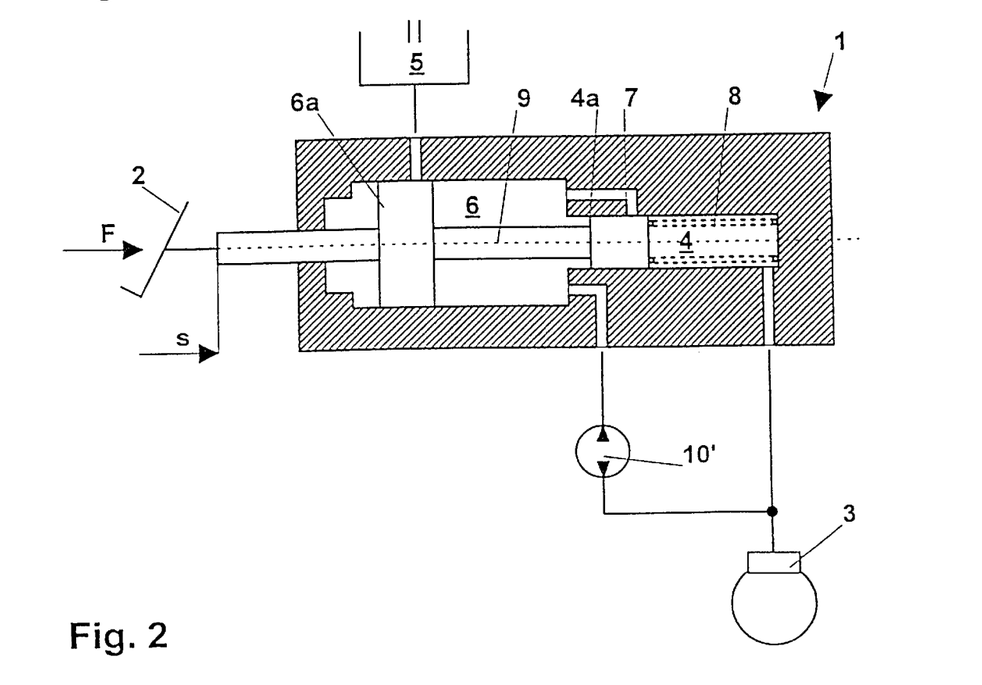
FIG. 2 shows an alternative embodiment of a hydraulic brake system in an actuated state.

If the brake-pressure-transmitter arrangement 1 is shifted into its actuating position shown in FIG. 2, the passage 7 is closed by the piston 4a and the volume of the hydraulic chamber 4 is reduced, whereby a brake pressure p is produced for the wheel brake 3. The brake pressure p is thereby obtained in a known manner as a function of the actuating force F, introduced via the brake pedal 2, and the working area $A_4$ of the piston 4a (p=F / $A_4$). Since the working area $A_4$ of the piston 4 is a known system parameter which does usually not change, the brake pressure p produced for the wheel brake 3 is proportional to the actuating force F introduced via the brake pedal 2 (p~F).

The additional hydraulic chamber 6 already mentioned is defined on its one side by a further axially displaceable piston 6a, which is operationally coupled to the piston 4a via a rigid connecting member 9. The pistons 6a, 4a, when the brake pedal is actuated, are therefore synchronously displaced in the axial direction against the action of the spring arrangement 8. Due to the operational coupling of the pistons 6a, 4a, the spring arrangement 8, when the brake pedal 1 is not actuated, causes the further piston 6a to also assume its basic position, in which the additional hydraulic chamber 6 is connected to the reservoir 5. It may be noted with regard to FIGS. 1 to 7 that, here, the working area $A_6$ is the cross-sectional area of the further piston 6a less the cross-sectional area of the connecting member 9, and the working area $A_4$ is the cross-sectional area of the piston 4a.

The additional hydraulic chamber 6 is connected via a further passage 11 to the input side 10e of a hydraulic pump 10, which serves to increase pressure and the output side 10a of which is connected to the wheel brake 3 or the hydraulic chamber 4, respectively. So that the further passage 11 constantly provides a connection from the additional hydraulic chamber 6 to the pump 10, i.e. the connection cannot be shut off, for example during a displacement of the further piston 6a, the further passage 11 opens into the additional hydraulic chamber 6 at the end face opposite the further piston 6a.

When the brake pedal 2 is actuated, the connection from the reservoir 5 to the additional hydraulic chamber 6 is also shut off by the further piston 6a and the volume of the additional hydraulic chamber 6 is reduced. The brake fluid displaced by the reduction in volume is delivered by means of the hydraulic pump 10 into the wheel brake 3 or the hydraulic chamber 4 and leads to an increase in the brake pressure p with unchanged actuating force F, or, in other words, the actuating force F introduced via the brake pedal 2 is amplified.

In the process, the degree of amplification or the transmission ratio (mechanical advantage) depends in principle on how the volumes of the hydraulic chambers 6, 4 change in relation to one another when the brake pedal 2 is actuated. In order to achieve an amplification in the order of magnitude of generally known (pneumatic) brake boosters, the volume of the hydraulic chamber 4, when the brake pedal 2 is actuated, must be reduced by a smaller percentage than the volume of the additional hydraulic chamber 6. Starting from a cylindrical form of the hydraulic chambers 6, 4 and a synchronous displacement of the pistons 6a, 4a by the same length of travel s in the axial direction when the brake pedal 2 is actuated, the volumes of the hydraulic chambers 6, 4 depend only on the working areas $A_6$, $A_4$ of the pistons 6a, 4a. This means that the working area $A_6$ of the further piston 6a must be greater than the working area $A_4$ of the piston 4a, so that the volume of the hydraulic chamber 4 is reduced by a smaller percentage than the volume of the additional hydraulic chamber 6. In this connection, the degree of amplification or the transmission ratio i can be determined in a simple manner according to the equation $i=1+A_6/A_4$. With compact dimensions of the brake-pressure-transmitter arrangement 1, for example a diameter of the piston 4a of 10 mm, a diameter of the further piston 6a of 24.5 mm and a diameter of the connecting member 9 of 4.5 mm, a transmission ratio of i=5 results. In the special case that the working areas $A_6$, $A_4$ are the same size ($A_6 = A_4$), the transmission ratio is i=2.

The hydraulic pump 10 could be driven permanently, for which purpose an operational coupling of the hydraulic pump 10 with a drive unit, which is present anyway in the motor vehicle, would be conceivable, which can be realized in a simple manner, for example by means of a drive belt. In this arrangement, in conformity with the function, no brake pressure would be produced in the wheel brake 3 when the brake pedal 2 is not actuated, since in this case brake fluid is merely recirculated from the additional hydraulic chamber 6 via the further passage 11 by the hydraulic pump 10 via the hydraulic chamber 4 and the passage 7. On the other hand, when the brake pedal 2 is actuated, a brake pressure p is produced in the wheel brake 3 in the manner described above, since in this case the hydraulic chambers 6, 4 are not connected to one another, so that recirculation of brake fluid is not possible.

However, it is already better for reasons of saving drive energy if the hydraulic pump 10 is driven only when the brake pedal 2 is actuated. Normally an electric motor (not shown) is provided for the drive of the hydraulic pump 10, and in the motor vehicle there is a so-called stop light switch (not shown), which detects the actuating state of the brake pedal 2 as a logic on/off signal. Thus, by means of an electronic control unit (not shown) which evaluates the signal of the stop light switch and provides an activating signal for the electric motor, it is possible in a simple manner to activate the electric motor (not shown), for driving the hydraulic pump 10, whenever the brake pedal 2 is actuated.

Provision may also be made for the electronic control unit to be able to vary the speed of the electric motor (not shown) via the signal activating the electric motor in order to be able to set the delivery rate of the hydraulic pump 10 in a variable manner. If, instead of or in addition to the stop light switch (not shown), sensor means (not shown) for detecting a variable related to the actuation of the brake pedal 2 are also provided, the output signal of which is fed to the electronic control unit, the delivery rate of the hydraulic pump 10 may be set as a function of the variable related to the actuation of the brake pedal 2. As a result, the control behaviour of the hydraulic brake system is improved with regard to pedal comfort and metering capacity. As a rule, the actuating travel or the actuating speed of the brake pedal 2 or the actuating force applied to the brake pedal 2 is sensed as the variable related to the actuation of the brake pedal 2.

However, the sensor means (not shown) for detecting the variable related to the actuation of the brake pedal 2 may also be arranged inside the brake-pressure-transmitter arrangement 1. Thus, for example, the displacement travel s, by which the pistons 6a, 4a are displaced in the axial direction when the brake pedal 2 is actuated, may be detected as a variable related to the actuation of the brake pedal 2. Since the working area $A_6$ of the piston 6a is a known system variable which does not change as a rule, the change in the volume $V_6$ of the additional hydraulic chamber 6, this change occurring when the brake pedal 2 is actuated, is proportional to the displacement travel s by which the further piston 6a is axially displaced ($V_6\sim s$). It is thus possible to set the delivery rate of the hydraulic pump 10 as a function of the change in the volume of the additional hydraulic chamber 6, as a result of which a virtually ideal control behaviour for the hydraulic brake system can be achieved.

In the embodiment shown in FIG. 1, the hydraulic pump 10 is designed for one delivery direction only, namely from the additional hydraulic chamber 6 to the wheel brake 3. So that flow cannot occur through the hydraulic pump 10 in the opposite direction, that is, from the wheel brake 3 to the additional hydraulic chamber 6, the hydraulic pump 10, on the input and output sides 10e, 10a, has non-return valves (not shown), which are preferably integrated in the hydraulic pump 10. This achieves the effect that, when the brake-pressure-transmitter arrangement 1 is actuated and the hydraulic pump 10 is not actuated—that is to say when the electric motor is not activated—the brake pressure p in the wheel brake can be kept at least temporarily constant.

According to FIG. 1, a valve arrangement 12, which can be brought into a first position 12.1 and a second position 12.2, is provided parallel to the hydraulic pump 10. In the first position 12.1, there is a direct connection between the additional hydraulic chamber 6 and the wheel brake 3; the hydraulic pump 10 is therefore bypassed. In the second position 12.2, the direct connection between the additional hydraulic chamber 6 and the wheel brake 3 is shut off, so that there is a connection between the additional hydraulic chamber 6 and the wheel brake 3 via the hydraulic pump 10 only. The first position 12.1 is the basic position, in which the valve arrangement 12 is resiliently biased, whereas the second position 12.2 is the actuating position, which the valve arrangement 12 assumes in a pressure-actuated manner, the pressure actuation being effected as a function of a pressure produced in the additional hydraulic chamber 6.

As soon as the pressure produced in the additional hydraulic chamber 6, upon actuation of the brake pedal 2, exceeds a predetermined pressure value, the valve arrangement 12 shuts off the direct connection between the additional hydraulic chamber 6 and the wheel brake 3, so that brake fluid can pass from the additional hydraulic chamber 6 into the wheel brake 3 only via the actual final controlling element, namely the hydraulic pump 10. This is especially important for realizing the above-mentioned control behaviours, during which the delivery rate of the hydraulic pump 10 is set.

If the brake pedal 2 is released, the pressure in the additional hydraulic chamber 6 drops and the valve arrangement 12 assumes its basic position 12.1 again in a resiliently biased manner. Thus brake fluid can flow back from the wheel brake 3 not only via the hydraulic chamber 4 and the passage 7 but also via the further passage 11 into the additional hydraulic chamber 6 and from there into the reservoir 5. This avoids a situation in which the brake pressure p in the wheel brake 3, upon release of the brake pedal 2, is reduced more slowly than it builds up in the wheel brake 3 when the brake pedal 2 is actuated. This therefore leads to an appreciable improvement in the dynamic behaviour of the hydraulic brake system. Ideally, the characteristic of the hydraulic brake system is designed in such a way that the time gradients are identical during the pressure increase and the pressure reduction.

The valve arrangement 12 has the following further advantage: normally the delivery rate of a hydraulic pump 10 is not available until after a certain start-up phase, during which the pressure build-up at the output side 10a of the hydraulic pump 10 occurs with a time delay. This disadvantage with regard to the performance of the hydraulic brake system can be avoided by so-called precharging of the hydraulic pump 10, wherein pressure is applied to the input side 10e of the hydraulic pump 10 during the start-up phase. Owing to the fact that the direct connection between the additional hydraulic chamber 6 and the wheel brake 3 is shut off by the valve arrangement 12 when the brake pedal 2 is actuated, such precharging of the hydraulic pump 10 is immediately effected. This aspect is of importance in particular if the drive for the actuation of the hydraulic pump 10 is not effected constantly but only when the brake pedal 2 is actuated.

Alternatively, the valve arrangement 12, instead of the pressure-controlled actuation just described, may also be designed with an electromagnetic actuating device. The activating signal for the electromagnetic actuating device would then be provided by the electronic control unit (not shown) and would be effected as a function of the actuating state of the brake pedal 2, this actuating state being evaluated in the electronic control unit in any case.

In the embodiment shown in FIG. 2, the hydraulic pump 10' is designed for two delivery directions, namely both from the additional hydraulic chamber 6 to the wheel brake 3 and from the wheel brake 3 to the additional hydraulic chamber 6. For the changeover of the delivery direction, a reversible drive may be provided for the actuation of the hydraulic pump 10'. If, as normal, an electric motor (not shown) is provided for the drive of the hydraulic pump 10', its direction of rotation must be reversible. Here, too, the appropriate activation is provided by the electronic control unit. Due to the design of the hydraulic pump 10' for the two delivery directions, the valve arrangement 12 is dispensed with compared with the embodiment shown in FIG. 1.

Figure 3:
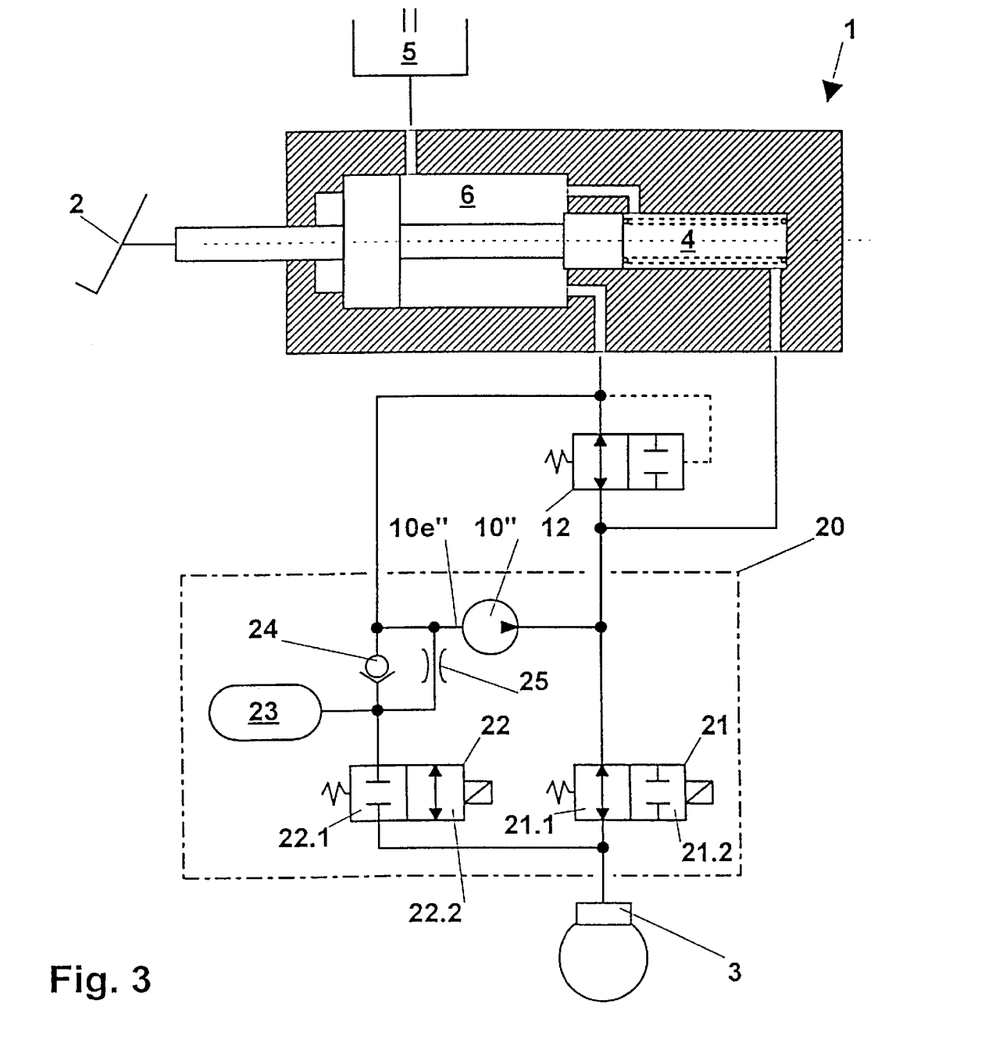
FIG. 3 shows a hydraulic brake system extended by an anti-lock control device.

Compared with FIG. 1, the hydraulic brake system shown schematically in FIG. 3 is extended by an anti-lock control device 20, which is arranged between the brake-pressure-transmitter arrangement 1 and the wheel brake 3. In a known manner, the anti-lock control device 20 comprises a first and second valve device 21, 22 in order to be able to modulate the brake pressure p in the wheel brake 3 by setting pressure-build-up, pressure-retention and pressure-reduction phases. Furthermore, the anti-lock control device 13 comprises an accumulator 23, also called accumulator chamber or expander chamber, into which brake fluid is discharged from the wheel brake during a pressure-build-up phase, as well as a hydraulic pump 10" in order to deliver brake fluid from the accumulator 23 back into the brake-pressure-transmitter arrangement 1 or the wheel brake 3. In the conventional manner, the valve devices 21, 22 are electromagnetically actuable and the hydraulic pump 10" is driven by an electric motor (not shown), the respective activating signals being provided by an electronic control unit (not shown). The electronic control unit, by means of sensors (not shown), detects the rotational behaviour of the wheels assigned to the wheel brakes 3 in order to carry out appropriate activation of the valve devices 21, 22 and of the hydraulic pump 10" if a locking tendency is detected at one of the wheels. The first valve device 21, in the non-activated state 21.1, connects the brake-pressure-transmitter arrangement 1 to the wheel brake 3, and the second valve device 22, in the non-activated state 22, shuts off the connection between the wheel brake 3 and the accumulator 23, so that a brake pressure p can be built up in the wheel brake 3. If a brake pressure in the wheel brake 3 is to be kept constant, the first valve device 21 is brought into its activated state 21.2, in which the connection between the brake-pressure-transmitter arrangement 1 and the wheel brake 3 is shut off. In order to reduce a brake pressure in the wheel brake 3, the first and the second valve devices 21, 22 are brought into their activated states 21.2, 22.2, so that the connection between the brake-pressure-transmitter arrangement 1 and the wheel brake 3 is shut off and the wheel brake 3 is connected to the accumulator 23. It may also be mentioned that the anti-lock control device 20, instead of being configured with two 2/2-way directional valves 21, 22, may also be configured with a mechanical volume-control valve instead of the first 2/2-way directional valve 21 or with an electromagnetically actuated 3/3-way directional valve instead of the two 2/2-way directional valves 21, 22.

It is essential for the hydraulic brake system shown in FIG. 3 that the hydraulic pump 10", which is in any case an integral part of the anti-lock control device 20, also performs the function of the hydraulic pump 10 according to FIG. 1, that is the amplification of the actuating force F introduced via the brake pedal 2. Thus a decisive contribution is made to the saving of components and thus costs. The brake-pressure-transmitter arrangement 1 and the anti-lock control device 13 can also be integrated to form a compact construction unit, a factor which, in addition to a further cost saving, in particular leads to a considerable saving of installation space in the motor vehicle. Furthermore, integration dispenses with the otherwise necessary connecting lines between the brake-pressure-transmitter arrangement 1 and the anti-lock control device 20, as a result of which the risk of leakages is minimized and the system safety of the hydraulic brake system is increased.

So that no brake fluid can escape from the additional hydraulic chamber 6 into the accumulator 23 when the brake pedal 2 is actuated, but is fed for the precharging directly to the input side 10e" of the hydraulic pump 10", a non-return valve 24 is arranged between the input side 10e" of the hydraulic pump 10" and the accumulator 23, which valve permits a flow connection in the direction from the accumulator 23 to the input side 10e" of the hydraulic pump 10" only.

In order to optimally adapt the comfort or feel during actuation of the brake pedal 2, a restrictor 25, as shown in FIG. 3, may additionally be arranged parallel to the non-return valve 24. In accordance with the dimensioning of the cross section of the restrictor 25, a certain quantity of brake fluid flows in this case from the additional hydraulic chamber 6 into the accumulator 23 upon actuation of the brake pedal 2, as a result of which a somewhat smaller quantity of brake fluid is fed to the input side 10e" of the hydraulic pump 10" for the precharging. This alternative therefore requires a compromise between optimum pedal comfort/feel on the one hand and maximum performance of the hydraulic brake system on the other hand.

Figure 4:
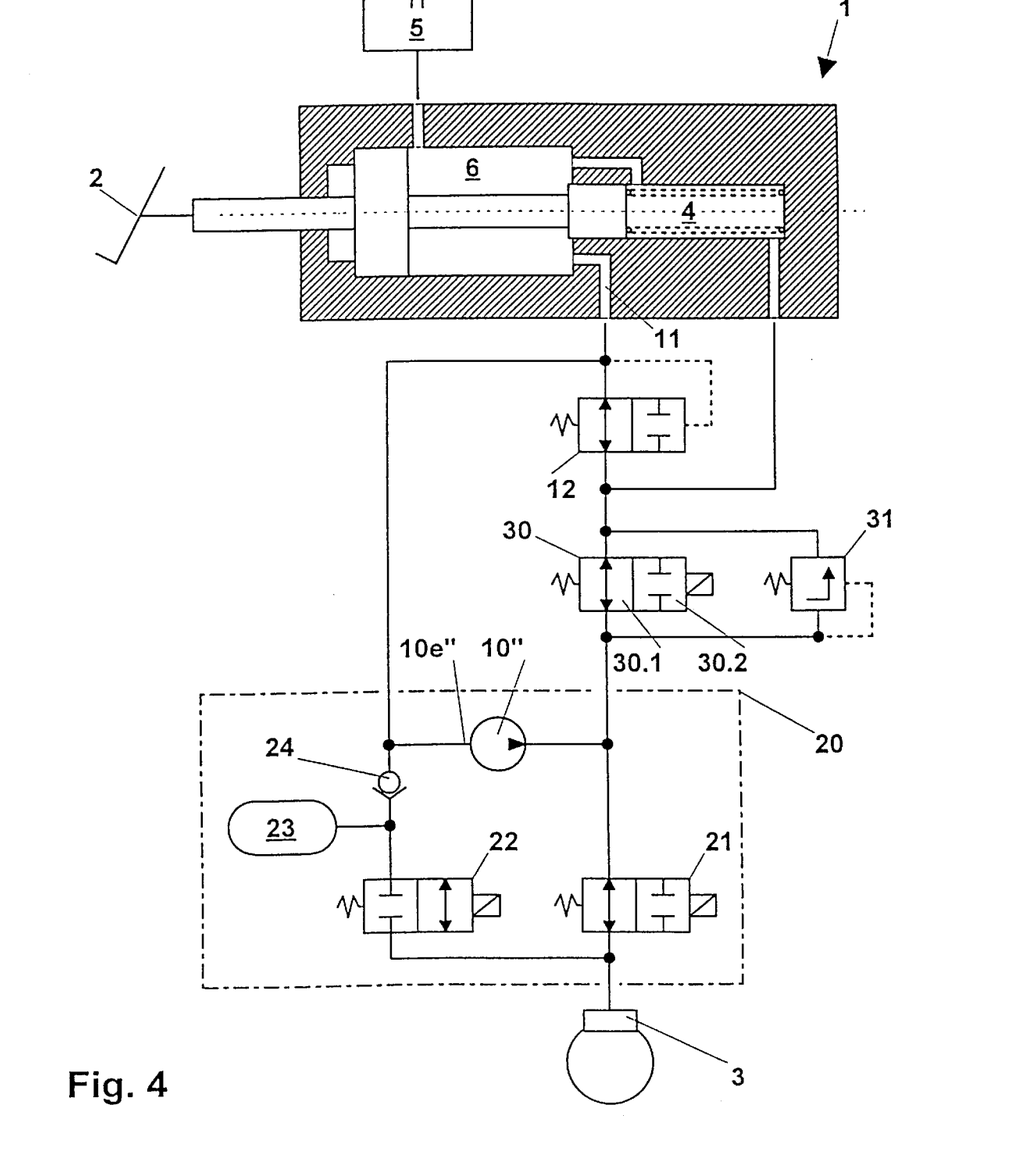
FIG. 4 shows a hydraulic brake system extended by an anti-lock control device and a traction control device.

Starting from FIG. 3, the hydraulic brake system shown in FIG. 4 is extended for carrying out traction control. To this end, a changeover valve 30 is arranged between the brake-pressure-transmitter arrangement 1 and the anti-lock control device 20 or the wheel brake 3, respectively. The changeover valve 30 is electromagnetically actuated, the activating signal again being provided by the electronic control unit (not shown). In the non-activated state 30.1, the changeover valve 30 connects the hydraulic chamber 4 of the brake-pressure-transmitter arrangement 1 directly to the anti-lock control device 20 or the wheel brake 3, respectively, so that normal braking and anti-lock braking are possible in the manner explained above. If traction control is to be carried out after a spinning tendency at one of the driven wheels assigned to the wheel brake 3 has been detected, the changeover valve 30 is first of all brought into the activated state 30.2, as a result of which the connection between the brake-pressure-transmitter arrangement 1 and the anti-lock control device 20 or the wheel brake 3, respectively, is shut off. At the same time, a brake pressure is built up in the wheel brake 3 by means of the hydraulic pump 10" in order to counteract the spinning tendency. To this end, the hydraulic pump 10" draws brake fluid from the reservoir 5 via the additional hydraulic chamber 6 and the further passage 11, which is possible, since no actuation of the brake pedal 2 is effected during traction control.

Arranged parallel to the changeover valve 30 is a pressure relief valve 31, which, during traction control, that is, when the changeover valve 30 is in the activated state 30.2, provides a connection from the wheel brake 3 to the hydraulic chamber 4 of the brake-pressure-transmitter arrangement 1 as soon as the brake pressure in the wheel brake 3 exceeds a predetermined pressure value. Damage to the hydraulic brake system or its components due to excessive pressures is thus prevented.

Starting from the hydraulic brake system shown in FIG. 3 having an anti-lock control device, the extension to the hydraulic brake system shown in FIG. 4 having an anti-lock device and a traction control device thus additionally requires only the use of the changeover valve 30 (and/or the pressure relief valve 31 arranged parallel thereto), so that the extension results in relatively little expenditure.

In this hydraulic brake system there is a constant connection from the brake-pressure-transmitter arrangement 1 or the additional hydraulic chamber 6, respectively, which is connected to the reservoir 5 when the brake pedal 2 is not actuated, to the input side 10e" of the hydraulic pump 10". On the other hand, in a conventional anti-lock brake system, the extension to a traction control device requires not only a changeover valve between the brake-pressure-transmitter arrangement and the anti-lock control device or the wheel brake, respectively, but also a further changeover valve as well as an additional connecting line, so that a connection can be provided between the input side of the hydraulic pump and the brake-pressure-transmitter arrangement or the reservoir, respectively.

Figure 5:
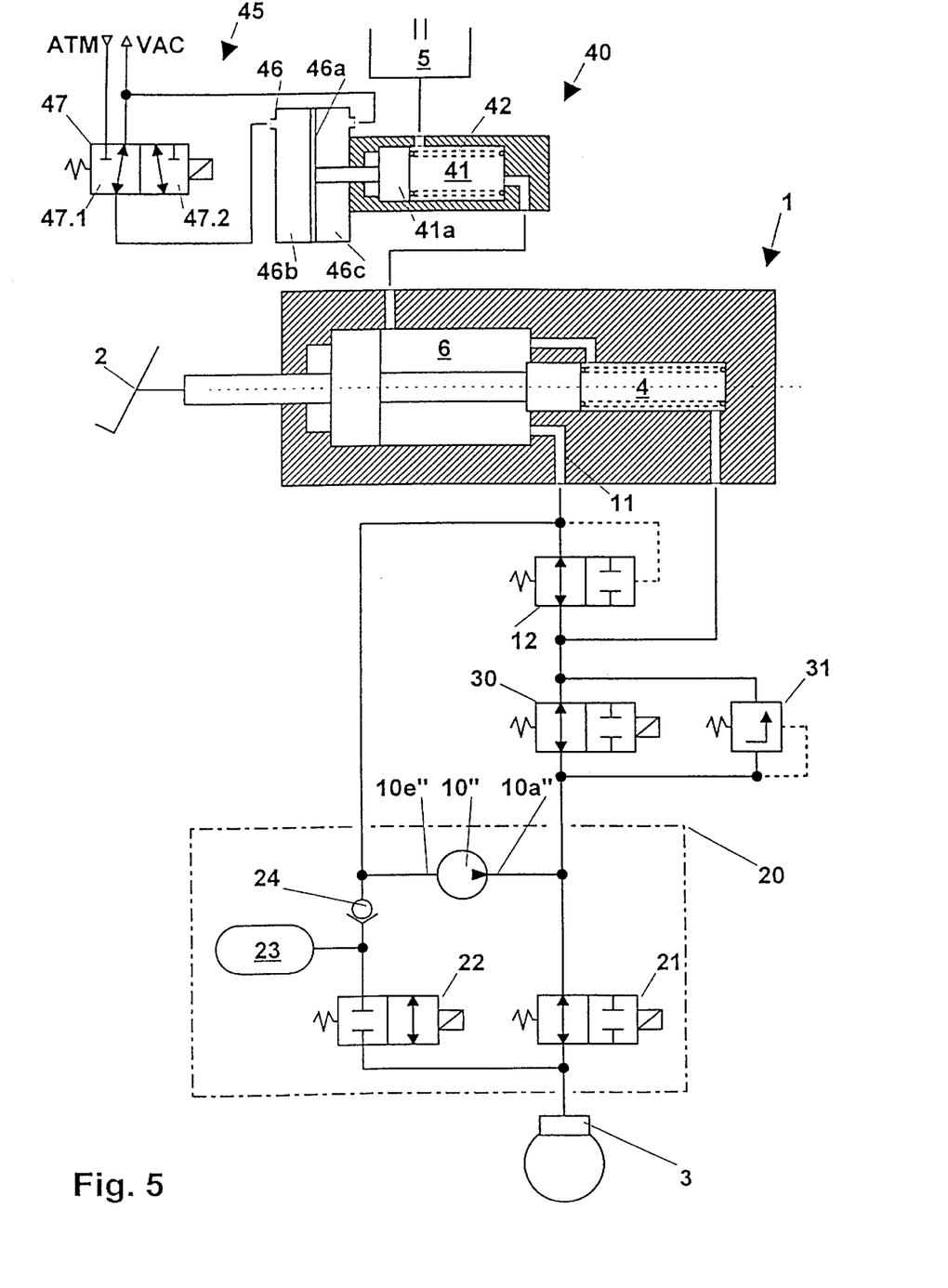
FIG. 5 shows a hydraulic brake system according to FIG. 4 extended by a precharging unit.

The hydraulic brake system shown in FIG. 5, starting from the hydraulic brake system shown in FIG. 4, is extended by a precharging unit 40. The precharging unit 40 is arranged between the reservoir 5 and the additional hydraulic chamber 6. By means of the precharging unit 40, it is possible, independently of braking effected by an actuation of the brake pedal 2, for example during traction control or vehicle dynamics control, to produce an admission pressure on the input side 10e" of the hydraulic pump 10". Thus, in a similar manner to that explained above in connection with the valve arrangement 12 and the non-return valve 24, a more rapid pressure increase is achieved at the output side 10a" of the hydraulic pump loll during the start-up phase of the hydraulic pump 10". This is very important in particular for the performance of the hydraulic brake system during vehicle dynamics control, during which, although high pressures are not absolutely necessary, very brief pressure-increase times are required instead during the precharging of the pump in order to maintain the driving stability of the motor vehicle, for example when cornering.

The precharging unit 40 has a pressure chamber 41, which is defined on one side by an axially displaceable piston 41a. A spring arrangement 42 counteracts the displacement of the piston 41a and causes the precharging unit 40 to assume the basic position shown in FIG. 4 in the non-actuated state. In the basic position, the piston 41a assumes a position in which the pressure chamber 41 is connected to the reservoir 5. When the precharging unit 40 is actuated, the piston 41a is displaced axially against the spring 42, wherein the connection between the pressure chamber 41 and the reservoir is interrupted, so that the brake fluid in the pressure chamber 41 is pressurized. Since the precharging unit 40 is actuated only when the brake pedal 2 is not actuated, there is a connection via the additional hydraulic chamber 6 and the further passage 11 from the pressure chamber 41 to the input side 10e" of the hydraulic pump 10" in order to supply the latter with brake fluid for the precharging.

An electronically controllable actuator 45 is provided for the actuation of the precharging unit 40. The electronically controllable actuator 45 comprises a housing 46, which is divided by a movable wall 46a into a pressure chamber 46b and a vacuum chamber 46c, the movable wall 46a being operationally coupled to the piston 41a. The vacuum chamber 46c is constantly connected to a vacuum source VAC (not shown in any more detail), whereas the pressure chamber 46b, by means of an electromagnetically actuated three/two-way directional valve 47, can be connected either to the vacuum source VAC or to atmospheric pressure ATM. The activating signal for the electromagnetically actuated three/two-way directional valve 47, as in the above embodiments, is provided by the electronic control unit (not shown). If the three/two-way directional valve 47 is in the non-activated state 47.1, the precharging unit 40 assumes the basic position shown in FIG. 5, in which the two chambers 46b, 46c are connected to the vacuum source VAC, so that no pressure difference is effective at the movable wall 46a and the spring arrangement 42 counteracts a displacement of the piston 41a. If the three/two-way directional valve 47 is shifted into the activated state 47.2, the pressure chamber 46b is connected to atmospheric pressure ATM, so that a pressure difference is effective at the movable wall 46a, under which pressure difference the piston 41a is displaced against the spring arrangement 42, whereby the precharging unit 40 is actuated.

Figure 6:
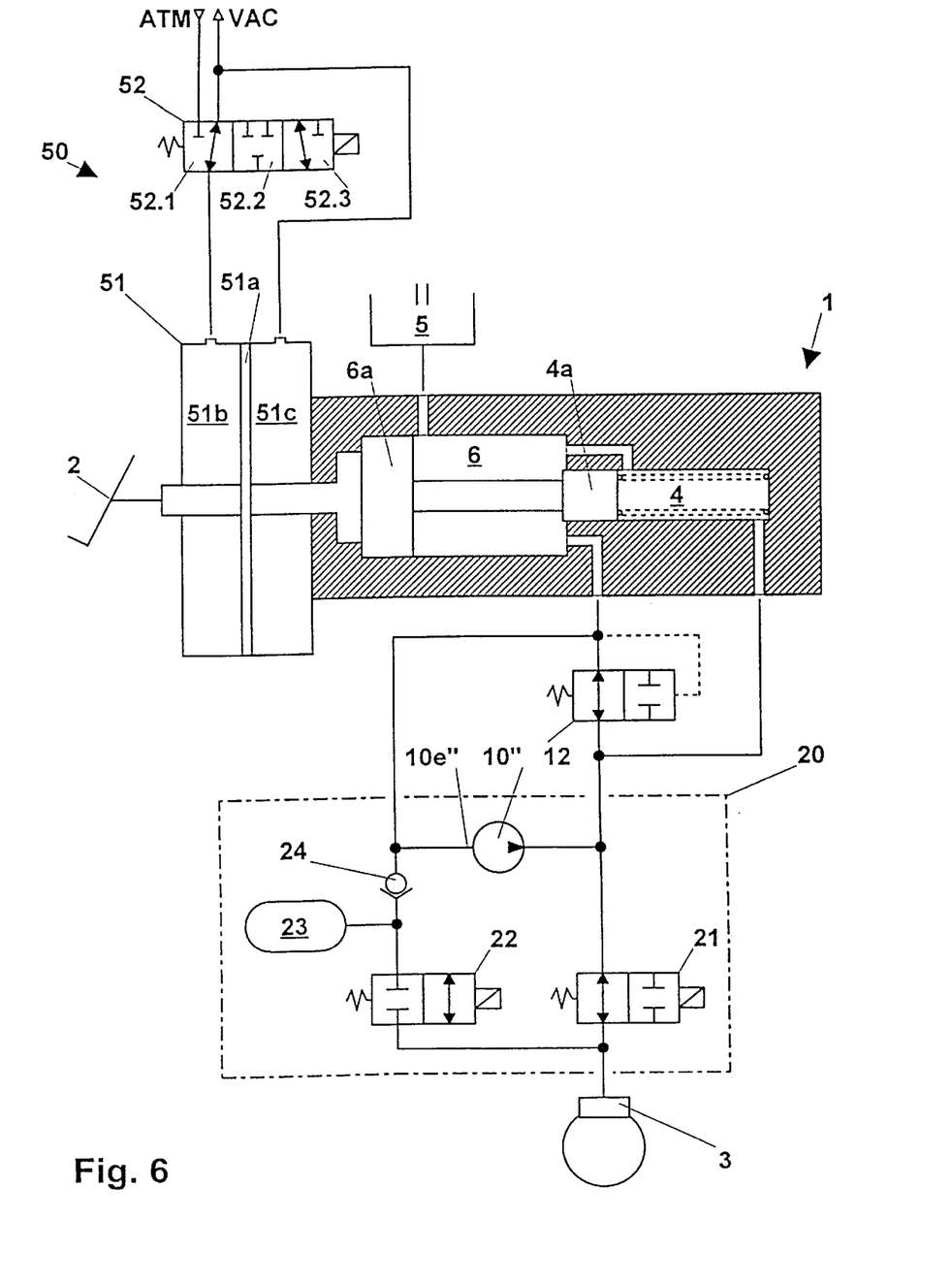
FIG. 6 shows a hydraulic brake system according to FIG. 3 extended by an electronically controllable brake booster.

In the hydraulic brake system shown in FIG. 6, the hydraulic brake system shown in FIG. 3 having an anti-lock control device is extended by an electronically controllable brake booster 50. The electronically controllable brake booster 50 enables the brake-pressure-transmitter arrangement 1 to be actuated instead of or in addition to an actuation via the brake pedal 2. That is to say that, on the one hand, braking operations, such as, for example, traction control, vehicle dynamics control or distance control, are possible when the brake-pressure-transmitter arrangement 1 is actuated "instead of" an actuation via the brake pedal 2 and, on the other hand, that, for example, emergency or directional braking can be initiated when the brake-pressure-transmitter arrangement 1 is activated "in addition to" an actuation via the brake pedal 2. It may also be mentioned that, in the hydraulic brake system according to FIG. 6, compared with the hydraulic brake systems according to FIGS. 4 and 5, the changeover valve 30 (and/or the pressure relief valve 31 arranged parallel thereto) is dispensed with, so that the higher expenditure for the electronically controllable brake booster 50 is to be considered in relative terms again. Functionally considered, however, it is to be taken into account here that no emergency or directional braking can be carried out with the hydraulic brake systems shown in FIGS. 4 and 5.

The construction and mode of operation of the electronically controllable brake booster 50 is in principle identical to that of the electronically controllable actuator 45 according to FIG. 5. Thus the electronically controllable brake booster 50 has a housing 51, which is divided by a movable wall 51a into a pressure chamber 51b and a vacuum chamber 51c, the movable wall 51a being operationally coupled to the pistons 6a, 4a of the brake-pressure-transmitter arrangement 1. Likewise, the vacuum chamber 51c is constantly connected to a vacuum source VAC (not shown in any more detail), whereas the pressure chamber 51b, by means of an electromagnetically actuated three/three-way directional valve 52, the activation of which is likewise effected by the electronic control unit (not shown), depending on the position, is connected to the vacuum source VAC (basic position 52.1) or shut off therefrom (actuating position 52.2) or can be connected to atmospheric pressure ATM (actuating position 52.3). In the basic position 52.1, a pressure difference at the movable wall 51a is reduced, whereas in the actuating position 52.3 a pressure difference at the movable wall 51a is built up or increased on account of the additional actuating position 52.2, it is possible in the case of the electronically controllable brake booster 50, compared with the electronically controllable actuator 45 according to FIG. 5, to keep a pressure difference present at the movable wall 51a constant for a certain period, so that the actuating force to be provided by the electronically controllable brake booster 50 or the actuating-force proportion produced by the latter can be controlled in a comfortable manner.

In regard to the electronically controllable actuator 45 (FIG. 5) and the electronically controllable brake booster 50 (FIG. 6), pneumatic types, for which a vacuum source is to be provided in the motor vehicle, have been considered above as an example. However, the embodiments of the hydraulic brake system according to the invention in accordance with FIGS. 1 to 4, compared with a conventional brake system, have the great advantage that no vacuum source is required. So that this advantage also applies to the embodiments according to FIGS. 5 and 6, there is of course the alternative of designing the electronically controllable actuator 45 (FIG. 5) and the electronically controllable brake booster 50 (FIG. 6) as, for example, purely electromagnetic, electrohydraulic, electromechanical or electromotive actuating units, for which no vacuum source is required.

Even if the electronically controllable brake booster 50 (FIG. 6) is nonetheless designed as a pneumatic type, there is still the advantage, compared with a conventional brake system, that installation space and costs can be saved. Since an electronically controllable brake booster, when used in a hydraulic brake system according to FIG. 6, only has to apply an actuating force or an actuating-force proportion in the order of magnitude of 20 percent of that of a conventional brake system, a simple booster having a diameter of 6 inches is sufficient for a motor vehicle which in the case of a conventional brake system ought to be equipped with a tandem booster of a diameter of 8 to 9 inches. Since a considerably "less powerful" brake booster is sufficient, the vacuum source can also be designed to be "less powerful"

and in this respect simpler and at a lower expenditure. In a motor vehicle equipped with a spark-ignition engine, even the vacuum produced in principle in the intake duct can be utilized in an uncritical manner in this case.

Figure 7:
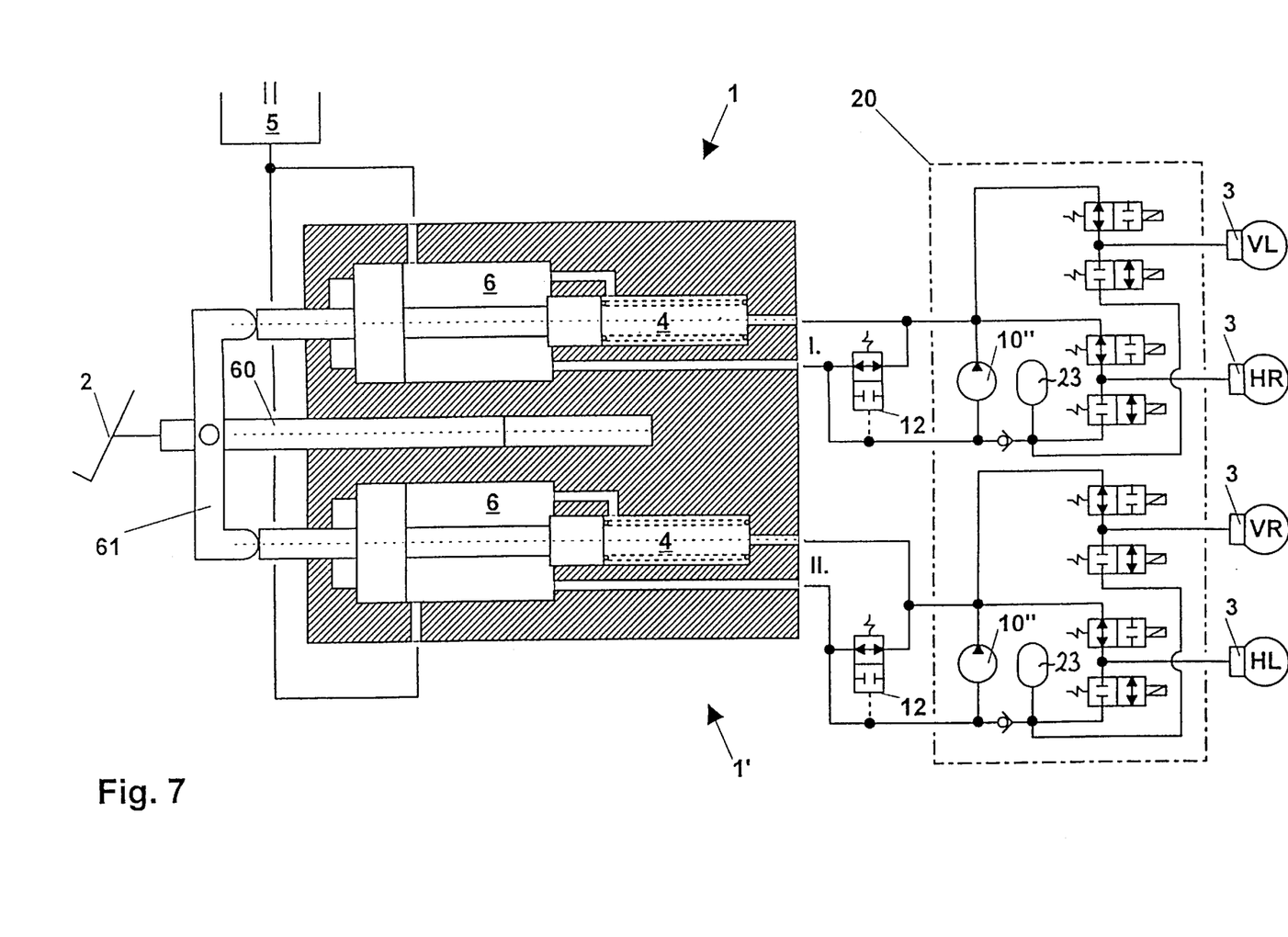
FIG. 7 shows a hydraulic brake system according to FIG. 3 designed for two brake circuits.

A hydraulic brake system according to the invention having an anti-lock control device 20 for a first and second brake circuit I., II. is shown in FIG. 7. In order to obtain an advantageous diagonally split brake-circuit system, the first brake circuit I. acts on the wheel brakes 3 assigned to the left front wheel VL and the right rear wheel HR of the motor vehicle, whereas the second brake circuit II. acts on the wheel brakes 3 assigned to the right front wheel VR and the left rear wheel HL of the motor vehicle. Of course, a so-called front/rear-split brake-circuit system would also be possible, for example by virtue of the fact that the first brake circuit I. would act on the wheel brakes 3 assigned to the wheels of the front axle VL, VR and the second brake circuit II. would act on the wheel brakes 3 assigned to the wheels of the rear axle HL, HR.

To produce the brake pressure p in the brake circuits I., II., in each case a brake-pressure-transmitter arrangement 1, 1' is provided for the first and second brake circuits I., II. Since the anti-lock control device 20, in a known manner, also has in each case a hydraulic pump 10" for each brake circuit I., II., these hydraulic pumps 10", as already explained in connection with FIG. 3, may be used for the amplification of the actuating force F, introduced via the brake pedal 2, in the brake-pressure-transmitter arrangements 1, 1'.

The brake-pressure-transmitter arrangements 1, 1' are arranged parallel to one another and thus can be actuated in synchronism via the brake pedal 2. Compared with a series arrangement, for example in the case of a dual piston master cylinder, this so-called twin arrangement has the advantage that brake pressures differing from one another, which are caused by sliding-friction losses of the pistons, cannot occur in the brake circuits. In a conventional brake system having a conventional master cylinder which has two pistons arranged in series, this is normally not considered to be especially critical. However, since a configuration of the hydraulic brake system shown as a tandem arrangement would have a total of four pistons arranged in series, the sliding-friction losses could prove to be critical. This is especially true because a relatively small pressure level is set in the additional hydraulic chamber 6, as a result of which pressure differences would have an adverse effect to a greater degree in terms of percent. The twin arrangement is therefore more advantageous with regard to the hydraulic brake system shown.

In order to prevent transverse forces from being transmitted to the brake-pressure-transmitter arrangements 1, 1', provided in each case for the first and second brake circuits I., II., when the brake pedal 2 is actuated, which transverse forces could possibly lead to jamming of the pistons 6a, 4a and thus to a malfunction of the hydraulic brake system, the brake pedal 2 is coupled to a guide element 60, which is axially displaceable parallel to the brake-pressure-transmitter arrangements 1, 1' provided in each case for the first and second brake circuits I., II. As shown schematically in FIG. 7, a suitable guide element 60 is, for example, a guide rod, which is accommodated in an axially displaceable manner in a cylindrical bore of the housing of the brake-pressure-transmitter unit.

When an actuating force F is introduced via the brake pedal, a balance-beam arrangement 61 is provided not only for ensuring a synchronous actuation of the brake-pressure-transmitter arrangements 1, 1', provided in each case for the first and second brake circuits I., II., but also for directing the actuating force F introduced via the brake pedal 2 from the guide element 60 into the respective brake-pressure-transmitter arrangements 1, 1' in equal proportions, so that an identical brake pressure occurs in the two brake circuits I., II.

Figure 8:
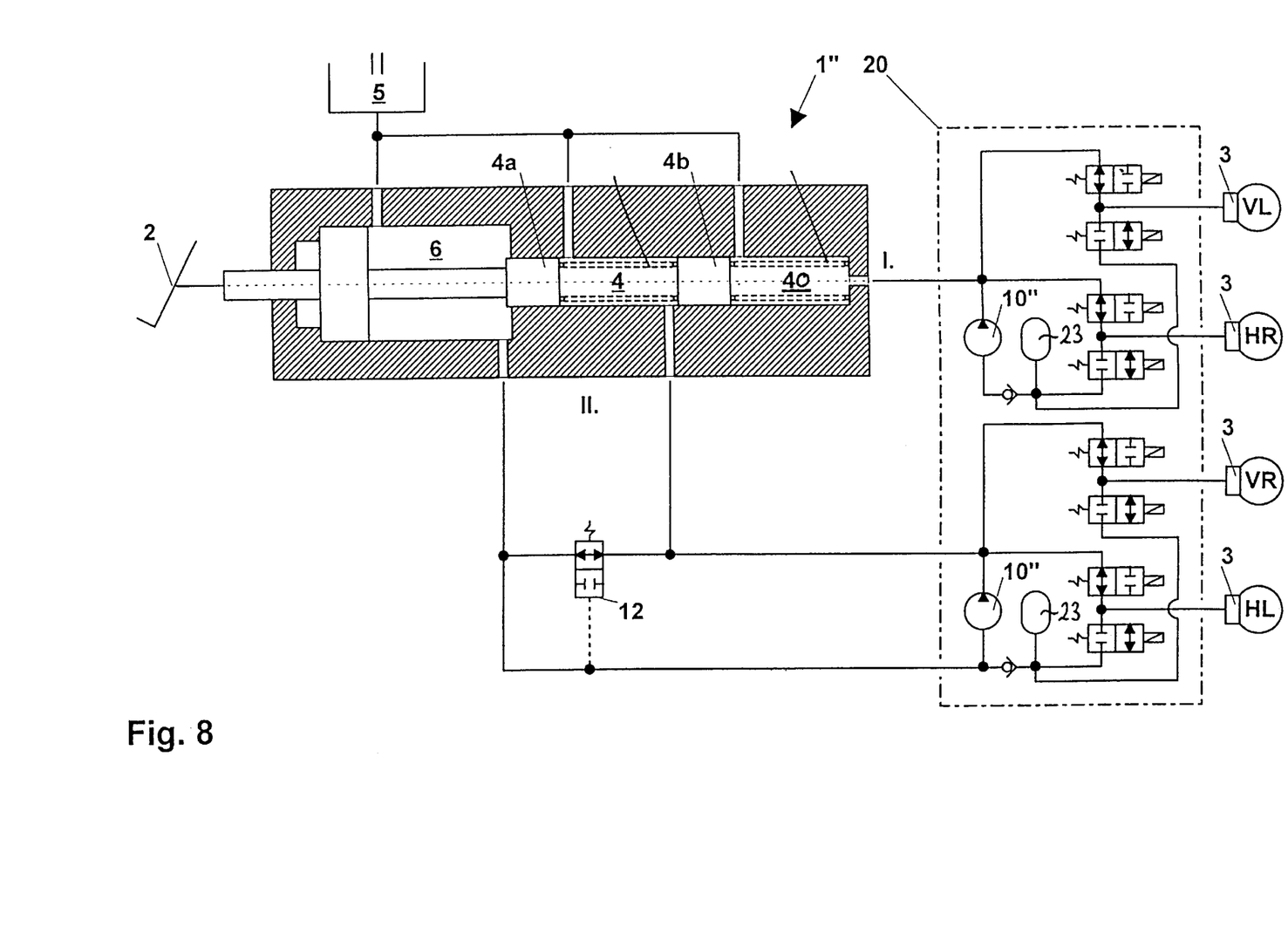
FIG. 8 shows an alternative embodiment of a hydraulic brake system according to FIG. 3 designed for two brake circuits.

An alternative embodiment of a hydraulic brake system according to the invention having an anti-lock control device for a first and a second brake circuit I., II. is shown in FIG. 8. Just as in FIG. 7, the first brake circuit I. acts on the wheel brakes 3 at the front on the left and at the rear on the right, whereas the second brake circuit II. acts on the wheel brakes 3 at the front on the right and at the rear on the left.

Unlike the exemplary embodiment according to FIG. 7, the brake system shown in FIG. 8 comprises a brake-pressure-transmitter arrangement 1" which in principle conforms to the brake-pressure-transmitter arrangement 1 in FIG. 1 but is supplemented by a second hydraulic chamber 40, which is connected in series with the hydraulic chamber 4. As can be seen from FIG. 8, the two hydraulic chambers 4 and 40 are separated from one another by a floating piston 4b, which is arranged in an axially sealing and displaceable manner in a bore of the brake-pressure-transmitter arrangement 1". A spring arrangement 40 is supported on the base of the bore and biases the floating piston 4b in its rest or initial position reproduced in FIG. 8. In this exemplary embodiment, the spring arrangement is supported on the other side of the floating piston 4b.

After introduction of an actuating force F, the displacement of the two pistons 4a and 4b causes brake pressure to be fed to the first brake circuit I. from the second hydraulic chamber 40, whereas brake pressure is fed to the second brake circuit II. from the first hydraulic chamber 4. In this state, as in FIG. 1, the output of the additional hydraulic chamber 6 is in fluid connection with the output of the hydraulic chamber 4 and with the input side of the one booster pump 10" shown in FIG. 8. Via the floating piston 4b, the brake-fluid pressure increased by means of the booster pump 10" is also transmitted to the brake fluid located in the second hydraulic chamber 40, so that the increased brake-fluid pressure can be fed to all the wheel brakes 3. In this case, the second pump 10", the top pump in FIG. 8, serves only to return brake fluid. Alternatively, the brake system reproduced in FIG. 8 may be modified in such a way that, during an actuation of the brake-pressure-transmitter arrangement 1", the output of the additional hydraulic chamber 6 is also in fluid connection with the input side of the top pump 10", which then likewise acts as a booster pump.

The exemplary embodiment shown in FIG. 8 permits the use of a conventional master cylinder provided with two hydraulic chambers connected in series, as normally used in dual-circuit brake systems. Such a master cylinder only needs to be supplemented by the additional hydraulic chamber 6, which, as shown, may be connected upstream of the two hydraulic chambers 4 and 40. Such a construction results in an especially compact brake-pressure-transmitter arrangement 1". Since only one additional hydraulic chamber 6 is required, pressure differences having an adverse effect also do not occur between the individual brake circuits.

What is claimed is:

1. A brake-pressure-transmitter arrangement for a hydraulic motor-vehicle brake system, which, after an actuating force (F) has been introduced via an input member, by reduction in the volume of a hydraulic chamber to be filled with brake fluid, provides a brake pressure at the output of the hydraulic chamber for at least one wheel brake, there being an auxiliary hydraulic chamber for brake fluid, the volume of said auxiliary hydraulic chamber is likewise reduced after introduction of the actuating force, and an output of the auxiliary hydraulic chamber being in fluid connection with an input side of a booster pump, characterized in that the booster pump delivers brake fluid in the direction from the auxiliary hydraulic chamber to said at least one wheel brake, and in that an output side of the booster pump is in fluid connection with the output of the hydraulic chamber, so that an increased brake pressure is provided for said at least one wheel brake.

2. The brake-pressure-transmitter arrangement according to claim 1, characterized by a second hydraulic chamber, which is to be filled with brake fluid and is connected in series with the hydraulic chamber, wherein the volume of said second hydraulic chamber, after introduction of the actuating force (F), is likewise reduced in order to provide a brake pressure at the output thereof for at least one further wheel brake.

3. The brake-pressure-transmitter arrangement according to claim 1, characterized in that, when the brake-pressure transmitter arrangement is not actuated, each hydraulic chamber and the auxiliary hydraulic chamber are in fluid connection with a reservoir for brake fluid, and in that, when the brake-pressure-transmitter arrangement is actuated, the fluid connection between the reservoir for brake fluid and each hydraulic chamber as well as the auxiliary hydraulic chamber is interrupted.

4. The brake-pressure-transmitter arrangement according to claim 2, characterized in that, when the brake-pressure-transmitter arrangement is not actuated, the hydraulic chamber is in fluid connection with the auxiliary hydraulic chamber.

5. The brake-pressure-transmitter arrangement according to claim 2 characterized in that, when the brake-pressure-transmitter arrangement is actuated, the fluid connection between the hydraulic chamber and the auxiliary hydraulic chamber is interrupted.

6. The brake-pressure-transmitter arrangement according to claim 1, characterized in that, after introduction of the actuating force (F), the volume of the hydraulic chamber is reduced by a smaller percentage than the volume of the auxiliary hydraulic chamber.

7. The brake-pressure-transmitter arrangement according to claim 1, characterized in that there is a constant fluid connection from the auxiliary hydraulic chamber to the booster pump.

8. The brake-pressure-transmitter arrangement according to claim 1, characterized in that the booster pump is actuated only when the input member is actuated.

9. The brake-pressure-transmitter arrangement according to claim 1, characterized in that the delivery rate of the booster pump depends on a variable related to the actuation of the input member.

10. The brake-pressure-transmitter arrangement according to claim 1, characterized in that the delivery rate of the booster pump depends on the change in the volume of the auxiliary hydraulic chamber.

11. The brake-pressure-transmitter arrangement according to claim 1, characterized in that flow cannot occur through the booster pump in the direction from the wheel brake to the auxiliary hydraulic chamber.

12. The brake-pressure-transmitter arrangement according to claim 11, characterized in that a valve arrangement is connected parallel to the booster pump, in which case, in a first position of the valve arrangement, the output of the auxiliary hydraulic chamber is in direct fluid connection with the outlet of the hydraulic chamber and, in a second position of the valve arrangement, there is a fluid connection between the output of the auxiliary hydraulic chamber and the output of the hydraulic chamber only via the booster pump.

13. The brake-pressure-transmitter arrangement according to claim 12, characterized in that the valve arrangement is resiliently biased in the first position and assumes the second position as a function of a pressure produced in the auxiliary hydraulic chamber.

14. The brake-pressure-transmitter arrangement according to claim 1, characterized in that the delivery direction of the booster pump is reversible, so that the booster pump can also deliver in the direction from the wheel brake to the auxiliary hydraulic chamber.

15. A hydraulic brake system having a brake-pressure-transmitter arrangement according to claim 1, characterized in that an anti-lock control device is arranged between the brake-pressure-transmitter arrangement and the wheel brake, the booster pump being an integral part of the anti-lock control device.

16. The hydraulic brake system according to claim 15, characterized in that a non-return valve is arranged between a pressure accumulator of the anti-lock control device and the input side of the booster pump and permits a fluid connection only in the direction from the pressure accumulator to the input side of the booster pump.

17. The hydraulic brake system according to claim 16, characterized in that a restrictor is connected parallel to the non-return valve.

18. The hydraulic brake system according to claim 15, characterized in that a changeover valve is arranged between the brake-pressure-transmitter arrangement and the anti-lock control device or the at least one wheel brake, respectively, in order to provide or interrupt a connection between the brake-pressure-transmitter arrangement and the anti-lock control device or the wheel brake, respectively.

19. The hydraulic brake system according to claim 18, characterized in that a pressure relief valve is connected parallel to the changeover valve.

20. The hydraulic brake system according to claim 18, characterized in that a precharging unit, which can be actuated by means of an electronically controllable actuator, is arranged between the reservoir for brake fluid and the auxiliary hydraulic chamber.

21. The hydraulic brake system according to claim 15, characterized in that there is an electronically controllable brake booster in order to actuate the brake-pressure-transmitter arrangement instead of or in addition to an actuation via the input member.

22. The hydraulic brake system according to claim 15, characterized by a first and a second brake circuit, there being one brake-pressure-transmitter arrangement for each of the first and second brake circuits.

23. The hydraulic brake system according to claim 22, characterized in that the brake-pressure-transmitter arrangements provided for the first and second brake circuits are arranged parallel to one another and can be actuated in synchronism via the input member.

24. The hydraulic brake system according to claim 23, characterized in that the input member is coupled to a guide element, which is axially displaceable parallel to the brake-pressure-transmitter arrangements provided for the first and second brake circuits.

25. The hydraulic brake system according to claim 23, characterized in that the actuating force introduced via input member is introduced via a balance-beam arrangement into the brake-pressure-transmitter arrangements provided for the first and second brake circuits.

26. The brake-pressure-transmitter arrangement according to claim 2, characterized in that, when the brake-pressure transmitter arrangement is not actuated, the hydraulic chamber, the second hydraulic chamber, and the auxiliary hydraulic chamber are in fluid connection with a reservoir for brake fluid, and in that, when the brake-pressure-transmitter arrangement is actuated, the fluid connection between the reservoir for brake fluid and each the hydraulic chamber, the second hydraulic chamber, and the auxiliary hydraulic chamber is interrupted.

27. The brake-pressure-transmitter arrangement according to claim 2, characterized in that, after introduction of the actuating force (F), the volume of the hydraulic chamber and the second hydraulic chamber is reduced by a smaller percentage than the volume of the auxiliary hydraulic chamber.

* * * * *